Oct. 22, 1940. H. NUTT ET AL 2,219,139
FRICTION CLUTCH
Filed Jan. 21, 1939 3 Sheets-Sheet 2
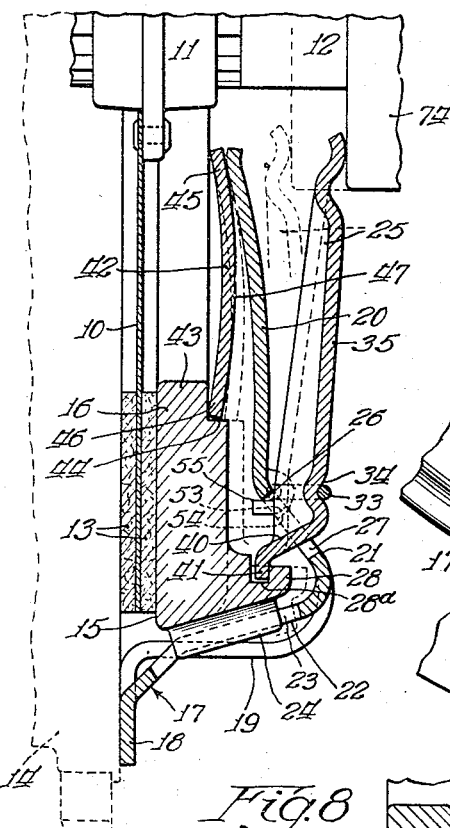
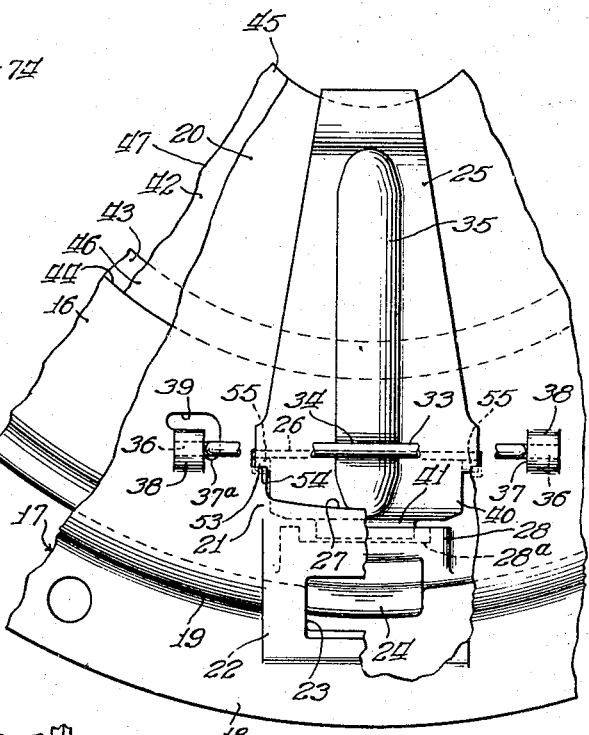
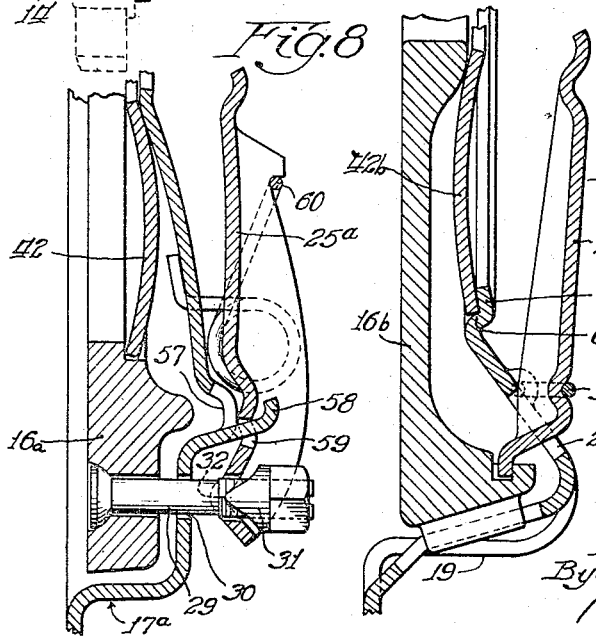
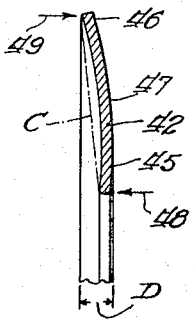
Inventors:
Harold Nutt and
Richard L. Smirl
By Edward C. Gritzbaugh
Atty Oct. 22, 1940.　　　　　H. NUTT ET AL　　　　　2,219,139
FRICTION CLUTCH
Filed Jan. 21, 1939　　　　3 Sheets-Sheet 3
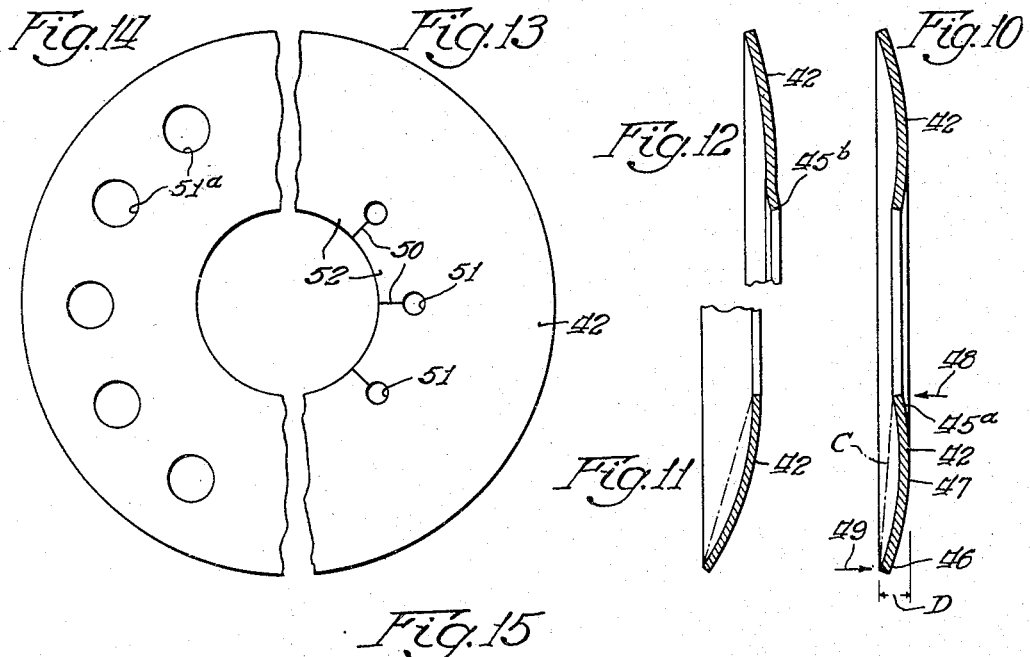
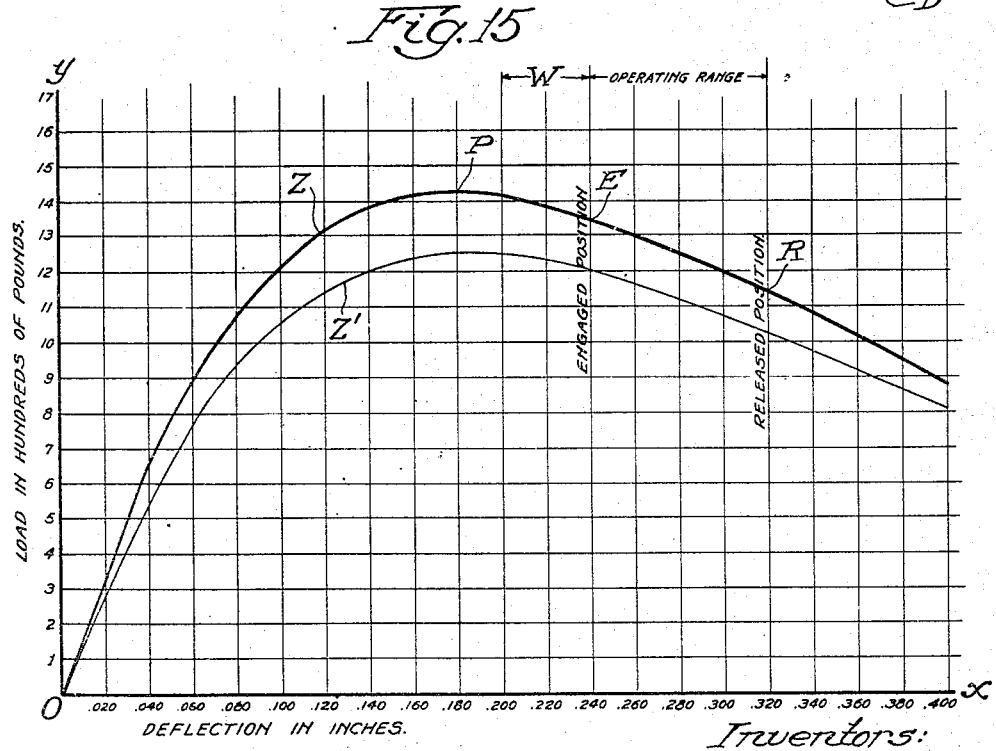
Inventors:
Harold Nutt and
Richard L. Smirl.
By: Edward C. Fitzbaugh
Atty.

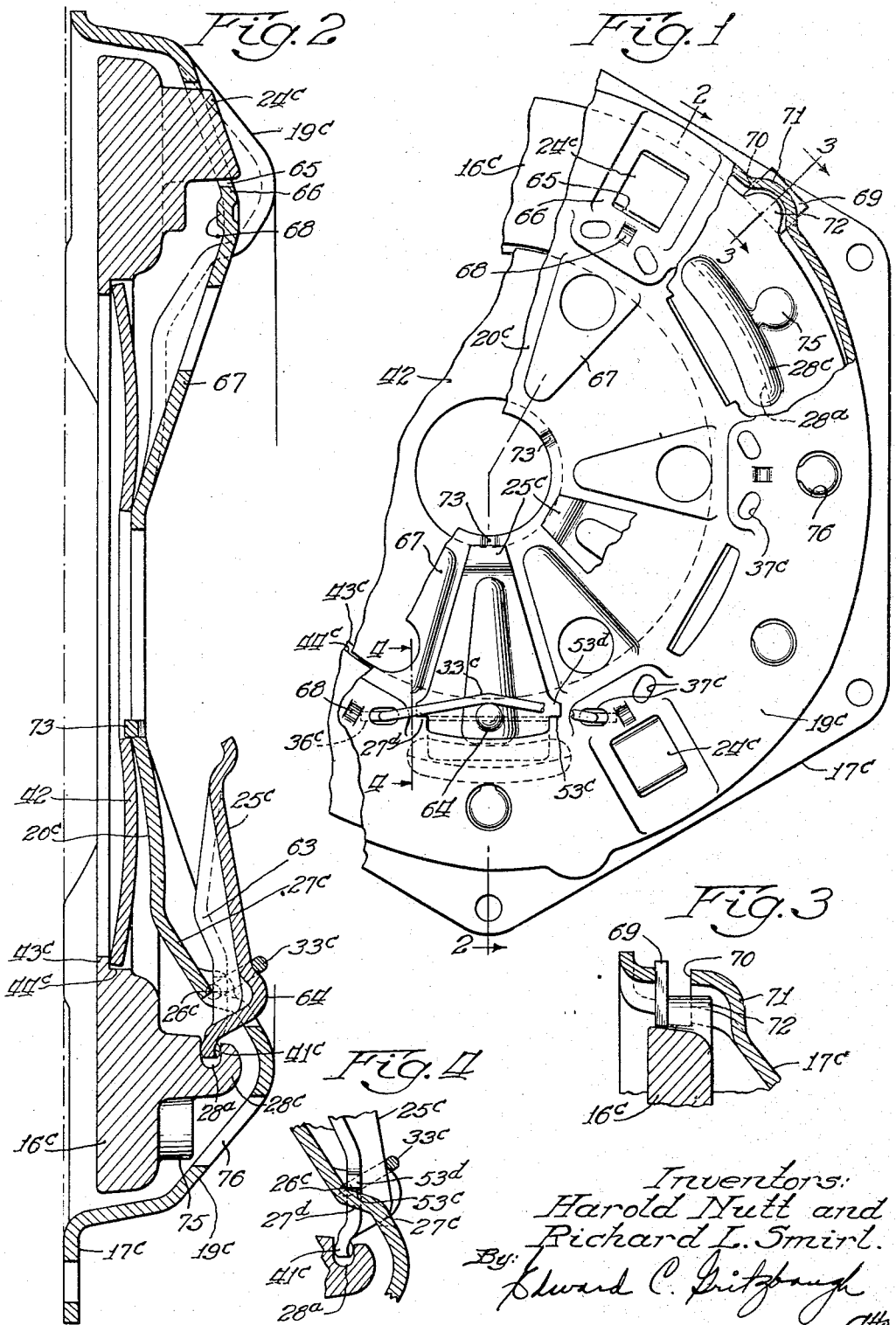

Patented Oct. 22, 1940

2,219,139

UNITED STATES PATENT OFFICE 2,219,139

FRICTION CLUTCH

Harold Nutt, Chicago, and Richard L. Smirl, Bellwood, Ill., assignors to Borg-Warner Corporation, Chicago, Ill., a corporation of Illinois Application January 21, 1939, Serial No. 252,190

18 Claims. (Cl. 192—68)

This application relates to friction clutches, and has as its primary object to provide a clutch that is economical to manufacture.

Specifically, the invention aims to provide a clutch in which the amount of spring steel required in the clutch, is reduced to a minimum without sacrificing the desirable characteristics of the spring mechanism of clutches now in common usage, but, on the contrary with an actual improvement therein.

In this respect, the invention contemplates the provision of an annular type packing spring having characteristics which allow it to be made much smaller than is possible in the now available annular type clutch spring, coupled with an increase in the load capacity and, in addition, more desirable deflection rate characteristics. The invention further aims, in this respect, to provide an annular type packing spring which is accommodated within the inner diameter of the pressure plate and serves as a baffle plate as well as a packing spring.

With respect to the deflection rate characteristics of the spring, it is aimed to provide an annular type spring of which the deflection curve has a negative rate throughout the entire operating range, including the range of facing wear, whereby, for a given load capacity in the engaged position of the clutch, the amount of work which must be done in releasing the clutch will be less than for zero or positive rate springs, and whereby the pressure exerted by the spring against the pressure plate of the clutch will increase in response to facing wear so as to compensate for the loss of friction due to the smoothing of the facings and so as to compensate for loss of load in the spring due to fatigue.

Another object of the invention is to provide a friction clutch incorporating a novel and improved arrangement of annular type packing spring in a friction clutch so as to reduce the axial dimension thereof.

Another object is to provide, in a friction clutch, a novel arrangement of cover plate and release levers, wherein the levers are fulcrumed directly against the edges of apertures in the plate, through which portions of the levers extend. One aspect of the improvement in this respect is the provision in the cover plate of a reentrant shoulder portion connecting the rim to the central web of the plate, the lever receiving apertures being formed in this shoulder portion and the levers being disposed largely within the reentrant space circumscribed by said shoulder portion.

Another object of the invention is to provide a novel arrangement for retaining in position a release lever which is fulcrumed by simple contact with an edge of the cover plate. To this end, the invention contemplates the employment of a bail-shaped tie element, the ends of which are hooked into the cover plate and the central region of which extends across and in confining contact with the lever.

Other objects, the advantages and uses of the invention will become apparent after reading the following specification and claims, and after consideration of the drawings forming a part of the specification, wherein:

Fig. 1 is a fragmentary rear elevation of a clutch embodying the invention.

Fig. 2 is an axial sectional view of the same taken as indicated by the line 2—2 of Fig. 1.

Fig. 3 is a detail sectional view taken as indicated by the line 3—3 of Fig. 1.

Fig. 4 is a sectional view taken as indicated by the line 4—4 of Fig. 1.

Fig. 5 is a fragmentary sectional view of the packing spring in its unstressed condition.

Fig. 6 is a fragmentary rear elevation of a clutch embodying a modified form of the invention.

Fig. 7 is a fragmentary axial sectional view thereof.

Fig. 8 is a fragmentary axial sectional view of another modification of the invention.

Fig. 9 is a fragmentary axial sectional view of another modification of the invention.

Fig. 10 is a sectional view of the packing spring, modified as to cross-sectional shape.

Fig. 11 is a fragmentary sectional view of the spring, illustrating another modification of cross-sectional shape.

Fig. 12 is a fragmentary sectional view of the spring embodying another modification of cross-sectional shape.

Fig. 13 is an elevation of the spring, modified as to circumferential continuity.

Fig. 14 is an elevation of the spring with another modification as to circumferential continuity; and Fig. 15 is a graph of the deflection rate of the spring.

The clutch shown in Figs. 6 and 7, as an illustration of one form in which the invention may be embodied, comprises a conventional driven plate 10, which may be mounted in any conventional manner upon a hub 11 splined on the driven shaft 12, and having friction facings 13 adapted to be engaged between the friction face of a conventional fly-wheel 14, and the friction face 15 of a pressure plate 16. The pressure plate 16 is, in accordance with conventional practice, enclosed between the fly-wheel and a cover plate, herein referred to generally by the reference numeral 17. The cover plate 17 is secured in the conventional manner by means of a flange 18, to the fly-wheel.

The cover plate 17 includes a rim portion 19, a central body portion 20 which is depressed axially toward the fly-wheel, and a reentrant shoulder portion 21 which connects the rim portion 19 to the central body portion 20. The rim portion 19 may be provided with conventional flattened regions 22 having lanced openings 23 to receive the driving lugs 24 of the pressure plate 16 whereby to establish a driving connection between the fly-wheel and the pressure plate through the medium of the clutch cover in accordance with conventional practice.

The present invention completely eliminates the usual coil type packing springs and utilizes the space formerly occupied by such springs in obtaining a much greater axial compactness than has formerly been possible. The cover plate 17, instead of being domed rearwardly to make room for the packing springs and the release lever mechanism formerly employed, is dished forwardly in its central region to bring the body portion 20 close to the plane of the rear face of the pressure plate 16, leaving just enough space therebetween to provide ample clearance for the pressure plate 16 in its retracted position, indicated in dotted lines in Fig. 7. The reentrant space thus provided, (the space circumscribed by the reentrant shoulder 21) accommodates the release levers 25.

Instead of the linkage which was formerly provided for fulcruming the levers relative to the cover plate, the levers, according to the present invention, are fulcrumed directly against the radial inner edges of openings 27 in the shoulder 21 of the cover plate. The shoulder 21 extends at a substantial angle relative to the axis of the clutch, which angle preferably is roughly in the neighborhood of 45°, so that the squared edge of an opening 27 presents, at the plane of contact of the lever 25 therewith, a knife edge fulcrum 26 for the lever.

The radially outer ends of the levers extend through the openings 27 and thus into the interior of the cover plate, where they engage in notches 28a in lugs 28 formed integrally with the pressure plate. Thus, the invention eliminates the linkage which is employed in many conventional clutches to connect the outer ends of the levers to the pressure plates, such as, for example, that embodied in the less preferred form shown in Fig. 8, wherein the release levers are disposed entirely outside of the cover plate, and connected to the pressure plate by pull links 29 mounted in the pressure plate, extending through openings 30 in the cover plate 17a, and provided with fulcrum yokes 31 engaging in depressions 32 in the outer ends of the levers.

Returning to the form of the invention shown in Fig. 7, the outer region of the lever 25 which projects through the opening 27 is inclined axially toward the fly-wheel as at 40, terminating in an end portion 41 for reception in the notch 28a of the lug 28, which end portion 41 is disposed in a radial plane substantially intersecting the axis of the fulcrum 26 and preferably somewhat forwardly thereof. This makes it possible for the axial depth of the rim portion 19 to be restricted so as to extend no further rearwardly than the plane of the rear extremities of the release levers. The release levers, in turn, being fulcrumed directly against the cover plate, with the fulcrum axes disposed just slightly rearwardly of the rearmost radial plane of the body portion 20, are adapted to utilize substantially all of the available space circumscribed by the shoulder 21. The central body portion 20 of the cover plate is inclined forwardly and inwardly as shown, so as to increasingly widen this space toward the center of the clutch in conformity with the increasing range of movement of each portion of the lever progressively further from its fulcrum.

This inclination of the body portion of the cover plate, in addition to providing the proper space to accommodate the swinging of the levers, brings the inner periphery of the cover plate substantially into the plane of the rear face of the pressure plate 16, in proper position for engagement with the inner periphery of the annular packing spring 42, which is so constructed and arranged as to add practically nothing to the axial dimension of the clutch. The outer region of the spring 42 is engaged against a reduced thickness central region 43 of the pressure plate, defined by a shoulder 44 which forms an annular recess in which the spring is located.

The spring 42 is in the form of a washer or annulus of spring sheet metal. In its unstressed state, shown in Fig. 5, it is roughly frusto-conical, its inner and outer peripheries being spaced axially from each other so as to define between them an imaginary cone indicated by the broken line C. The spring is dished rearwardly from the imaginary cone C, so that its inner peripheral reginon 45 is substantially tangent to a plane perpendicular to the axis of rotation, whereas its outer peripheral region 46 is inclined rearwardly and inwardly.

In the ensuing discussion of the characteristics of the spring, reference will be made to the "height," "crown," and "thickness" of the spring. The term "height" is employed to designate the axial dimension between the plane of the axial extremities of the spring, i. e., a plane tangent to the convex side of the curved intermediate region 47 and the plane where the peripheral edge of the spring contacts the pressure plate. The term "crown" is employed to designate the maximum distance between the imaginary cone C and the concave surface of the intermediate region 47. The term "thickness" is of course employed to designate the thickness of the material of which the spring is composed.

The spring is arranged with relation to the remainder of the clutch mechanism so that pressure will be exerted against its inner and outer peripheries as indicated by the arrows 48 and 49 respectively of Fig. 5. It is assembled under initial compression so as to bring its inner and outer peripheries closer together axially, and during clutch release operation, its peripheries will be further deflected toward a common plane.

The action of the opposed forces as indicated by the arrows 48 and 49 flattens out the imaginary cone C toward a radial plane, thus tending to increase the distance between the outer and inner peripheries of the spring as projected upon such radial plane. As a result, the spring is placed under radial compression; the outer peripheral region 46, which tends to increase in diameter, is subjected to circumferential tension, and the inner peripheral region 45 which tends to contract in diameter, is placed under circumferential compression. The intermediate region 41 is subjected to a bowing action as a result of the radial compression.

The radial compression in the spring will vary from a maximum in the intermediate region to a minimum at the peripheries, whereas the circumferential stress distribution varies from a maximum at the peripheries to a minimum in the intermediate region. It is contemplated that the diameter of greatest radial compression may be made to coincide with the neutral diameter of circumferential stress, by making the crown slightly unsymmetrical, and thereby a still more uniform distribution of stress may be obtained.

In the conventional conical spring, the radial compression in the intermediate region is resisted with practically no deflection, and causes the peripheral regions to undergo the major portion of the distortion incidental to deflection. Increasing the height D of a true cone increases the distortion at the edges, and consequently increases the stress, which reaches a practical limit at the inner periphery before it does at the outer periphery, because of the greater area of the latter. Furthermore, if the height exceeds the thickness of the spring by more than about 50 per cent., the deflection rate goes from positive to negative and back to positive again, all within the range of customary operating deflection.

In the present invention, the intermediate region undergoes a large proportion of the distortion, in the form of increased bowing, thereby relieving the peripheral regions of a portion of the distortion which otherwise would be imposed upon them. Consequently, for a given operating load, the initial depth of the spring may be greater, and the total energy absorbed by the spring may be increased by the amount distributed to the formerly inactive intermediate area. Thus by increasing the height, the spring is given a greater load capacity without change in the diameter or the thickness of the spring.

By increasing the curvature of the crown, the "rate" of the spring, i. e., the ratio of increase of the load to increase in deflection, is increased toward the positive side. In a truly conical or nearly conical spring, if the height is allowed to exceed a critical point, a very decided and undesirable type of negative rate is developed, wherein the load, beyond a given point of deflection, will decrease with increased deflection, until it becomes a negative load and the spring "turns inside out" and refuses to return to its initial position. Because of this characteristic, it has been necessary in prior springs of the conical type, to restrict the depth, and in so doing the load capacity of the spring has been limited.

The present invention secures a very considerable increase in load capacity and at the same time counteracts the tendency toward such an undesirable negative rate, by combining an increase in height with the curved or crowned cross-section. This improvement is characteristic of all of the disclosed forms of the invention, including the plain annulus shown in Figs. 1 and 5, circumferentially continuous throughout its entire radius, and the modifications shown in Figs. 13 and 14, which are circumferentially interrupted.

While the invention aims to avoid the undesirable type of negative rate described above, it does not propose to avoid the negative rate entirely. In fact, it is an object of the invention to utilize a modified type of negative rate in order to secure advantages which have heretofore been unavailable, so as to decrease the amount of work which must be done by the operator in releasing the clutch from any given load at complete engagement.

In prior clutches embodying the cone-type spring, substantially zero deflection rates have been utilized in the operating range of deflection. The deflection curve of such a spring shows first a positive rate or increase in load during an initial stage of deflection, then a substantially zero, or slightly negative rate, substantially constant or slightly declining load during an intermediate stage, and again a positive rate during a final stage of deflection. A disadvantage of such springs has been the narrowness of the range of substantially zero rate. Because of this, it was necessary to include within the operating range, portions of the positive rate deflections in the initial and final stages. The resulting increase in load in the final stage of clutch release is objectionable.

In the present invention, by moderately crowning a spring having the proper proportion of height and thickness, it becomes possible to combine a considerably increased load capacity with a greatly extended range of non-positive deflection rate, sufficiently broad to embrace the entire operating range of a clutch plus the range of facing wear. For example, a spring having an overall diameter of approximately 6 inches, a thickness of approximately .095 inch, a crown of approximately .070 inch, and a height of approximately 135 per cent. more than its thickness (as above pointed out, in prior springs, a height of 50 per cent. more than thickness has been considered critical) displays these desirable characteristics. Such a spring, fatigue-tested for 500,000 cycles of engagement under a preload 1240 lbs. stood up without failure.

In addition to extending the non-positive rate deflection range of the spring as described above, the invention makes it possible to secure a very pronounced negative rate which does not, however, approach the objectionable zone of negative load characteristic of conical springs having too much depth. The plain, uninterrupted spring of Fig. 1 gives a moderate negative rate. The negative characteristic can be definitely increased by interrupting the spring at intervals around its circumference in a zone occupying a minor portion of its radius, as shown in Figs. 13 and 14. In one form of the invention, as shown in Fig. 13, this interruption takes the form of shared slits 50, without thickness, forming a plurality of tongues 52 which are in contact with each other so that the inner region 45 of the spring may be placed under circumferential compression in the initial stage of deflection. The slits 50 may terminate in openings 51 which serve to prevent extension of the slits under repeated deflection of the spring.

In one of its aspects, the invention contemplates that the inner region 45, under the action of the opposed forces 48 and 49, or in its unstressed state as shown at 45a in Fig. 10 may be bowed toward the plane of the outer periphery so as to become reentrant as shown for example in Fig. 2, although in the preferred form of the invention as shown in Fig. 5, in its unstressed state, the inner region is not reentrant to any appreciable degree, and may, as shown in Fig. 11, be completely non-reentrant in the unstressed state. As the inner region becomes increasingly reentrant under deflection, there is an increased tendency to set up circumferential tension in the inner region as opposed to the circumferential compression which is a resultant of the radial compression, and as a result, a point will be reached where the compressive forces are neutralized and the inner region 45 will be placed under circumferential tension.

The slits 50 prevent fracture of the inner region 45 under the circumferential tension produced in the final stage of deflection. The slits 50, by preventing to a large extent the build-up of circumferential tension in the inner region of the final stage of operation, decrease the load required for this final stage of deflection, and thereby prolong and increase the negative characteristic. During the initial stage of engagement when they are in abutting contact with each other, the tongues 52 have the characteristics of a continuous annulus, whereas in the final stage of deflection they tend to separate from each other and bend as independent tongues.

In the form shown in Fig. 14, the negative characteristic is increased and extended as a result of the provision of a series of openings 51a in the neutral zone of the annulus. The openings 51a separate the continuous inner and outer regions 45 and 46 and greatly increase the yieldability of the neutral region to the bowing action.

In the form shown in Fig. 12, the inner region 45b is provided with a reverse curve as shown, which tends to counteract the setting up of circumferential tension in the inner region during the final stage of deflection. This also increases and extends the negative characteristic by partially neutralizing the stress in the inner region during the latter stage.

Increasing the "slope" and extent of the negative portion of the deflection curve (shown in graph form in Fig. 15) is attained in the present invention without even closely approaching zero or negative load on the down-swing of the curve. This is made possible by the high load capacity obtained by the curve on its initial up-swing indicated at Z. The extension of the negative portion of the curve makes it possible to pre-load the spring to a point where its operating range falls entirely within the negative portion of the curve, and in addition, ample allowance for facing wear may be made so as to maintain the operating range within the negative portion of the curve during the entire life of the driven element of the clutch.

For example, as illustrated in Fig. 15, the spring may be pre-loaded to an initial load of 1350 lbs. as read on the curve Z in connection with the ordinate scale Y, and an initial deflection of .24 inch as read on the curve Z in connection with the abscissa scale X. This point of pre-loading, representing the fully engaged position of the clutch when new, is indicated on the scale at E, the full released position of the clutch being indicated at R, and the operating range of the clutch when new corresponding to that portion of the curve lying between the points E and R.

In arriving at the pre-loading point E, the spring will have followed the curve Z from a starting point O of no deflection and no load to a maximum load of 1430 lbs. at .18 inch deflection, represented at P as the peak of the curve, beyond which the amount of pressure required to be exerted against the spring in order to produce further deflection, has begun to decrease.

Between the peak load point P and the initial pre-loading point E, there remains a declining portion of the deflection curve, which may be referred to as the "take-up" zone, (indicated at W) into which the operating range will gradually shift as the facings of the driven member wear down. This results from gradual shifting of the pressure plate toward the fly-wheel, allowing the spring to return toward its undeflected position, and to thereby increase its load as long as its deflection remains on the declining side of the peak load point P.

There is a definite advantage in thus increasing the load, in that it compensates for loss of friction in the smoothing of the facings, and also for reduction in spring load under repeated flexing. The loss of load after 575,000 cycles of deflection, is indicated in the graph by the curve Z'.

The curve shown in Fig. 15 represents the results of tests on a spring having the characteristics shown in Figs. 5 and 13, having a thickness of .095 inch, a height of .267 inch and a crown of .091 inch. Tests on a similar spring, differing only in having a thickness of .100 inch and a depth of .272 inch, gave a maximum load capacity of over 1600 lbs. when new, and of about 1550 lbs. after 250,000 cycles of deflection.

Each lever 25 is held against its fulcrum by a bail 33 engaging in a depression 34 in the central reenforcing rib 35 of the lever, and having end trunnions 36 received in openings 37 and 37a in the cover plate, and hooked behind flap portions 38 upstruck from the cover plate. The opening 37a may be in the form of a "bayonet" slot having a portion 39 parallel to the bail 33 so as to receive one end trunnion 36 of the bail in order to allow attachment and detachment thereof.

The end trunnions 36 when in place beneath the strap portions 38, are axially aligned with the fulcrum 26, so that the bail 33 may swing with the lever 25 around the fulcrum axis without at any point resisting the free swinging of the lever.

The major portion of the mass of each lever 25 is located rearwardly of its fulcrum 26. As a result, centrifugal force acting on the levers tends to rotate them counter-clockwise as viewed in Fig. 7, causing the outer end regions 41 to press against the pressure plate 16 and to increase the packing pressure thereof, with increased speed of rotation.

The bails 33 hold the levers against their fulcrums in opposition to the tendency of centrifugal force to pull the levers away. Being of spring material, the bails will at all times exert a resilient force against the levers. Being thus maintained under constant stress, the bail will not be apt to break. The tendency of centrifugal force to move the levers 25 bodily outwardly in a radial direction is opposed by shoulders 53, formed on the levers 25, which are adapted to engage against shoulders 54 formed in the cover plate 17 at the lateral extremities of the opening 27. The levers are located against radially inward movement by fingers 55 which form continuations of the shoulders 53, extending axially into engagement with the inner edge of the opening 27.

Instead of extending the levers 25 through openings 27 in the cover plate, the levers may be located entirely outside of the cover plate as shown in Fig. 8. In this case, the levers 25a are fulcrumed against raised fulcrums 57 formed in the cover plate 17a, and may be secured against bodily outward movement by hooks 58 upstruck from the fulcrum 57 and extending through openings 59 in the respective levers 25.

This form of the invention also contemplates the previously described linkage for connecting the lever to the pressure plate, and a mouse-trap type spring 60 of conventional construction and arrangement, for maintaining the lever against its fulcrum.

In the form of the invention shown in Fig. 9, the spring 42b, instead of being arranged with its inner periphery in engagement with the cover plate, as in the preferred form of the invention, is arranged with its inner periphery engaged against a pressure plate 16b, which may for this purpose be extended further radially inwardly than in the preferred form of the invention, and with its outer periphery engaged against the forward side of a flange 61 forming the inner extremity of the cover plate. A shoulder 62, formed adjacent the flange 61, serves to locate the spring 42b in properly centered relation. The remainder of the mechanism may be the same as in the form of the invention shown in Fig. 7.

The preferred form of the invention is shown in Figs. 1 and 2. In this form, the flange 43c of the pressure plate is reduced to minimum thickness so that not only the spring 42, but a portion of the central body portion 20c of the cover plate, is received within the space circumscribed by the shoulder 44c. The release levers 25c are substantially the same in construction as those shown in Fig. 7, with the exception that their intermediate regions are formed as at 63 to conform to the shape of the reentrant shoulder 27c which in this case is prolonged inwardly beyond the fulcrum 26c. The ends 41c of the levers 25c are provided with semi-cylindrical regions extruded alternately in opposite directions to form a roughly cylindrical bearing portion for engagement between the sides of the notch 28a of the lug 28c.

In this form of the invention, the driving lugs 24c, instead of extending through the rim 19c, extend through openings 65 in flat portions 66 struck inwardly from the rim 19c in a plane perpendicular to the axis of the clutch.

The cover plate 17c is provided with a series of ribs 67 in its central body portion 20c, intermediate the levers 25c. The ribs 67 strengthen and reinforce the cover plate.

The bails 33c have their ends 36c hooked through elongated openings 37c and located against depressions 68 in the cover. A bail may be removed by springing one end to clear its corresponding depression 68 and then sliding the bail longitudinally until its other end clears the end of its respective opening 37c.

In packing the clutches for shipment, it is desirable to retain the pressure plate and levers within the confines of the periphery of the cover plate 17. This requires compression of the spring 42, and the invention therefore contemplates the employment of retainer bars 69, received in slots 70 in outwardly recessed portions 71 of the cover plate 19c, and braced by bridging across the side walls of the recesses. The bars 70 engage lugs 72 projecting from the periphery of the pressure plate 16c, and thereby retain the pressure plate in properly assembled position until, in the assembly of the clutch, the cover 19c is bolted to the fly-wheel 14, whereupon the pressure plate will be moved slightly away from the bars 70, removing the load from the bars and allowing them to be readily removed.

Another feature of improvement in the form shown in Figs. 1 and 2, is the piloting of the spring 42 by the engagement of its inner periphery around a series of spaced lugs 73 upstruck from the inner region of the cover plate 19c, and the provision of clearance space between the outer periphery of the spring 42 and the shoulder 44c. This allows for whatever expansion in diameter of the spring may take place either due to compression or temperature changes, without such expansion being interferred with by the shoulder 44c.

The shoulders 53c, instead of being part of the fingers 55, in this form of the invention are formed as the inner edges of a separate pair of fingers 53d, and they engage against the exterior surface of offset intermediate portions 27d of the shoulder 27c.

The lugs 75, shown in Fig. 2, formed on the pressure plate 16c and accessible through openings 76 in the cover 19c, are balancing lugs.

In the operation of a clutch constructed and assembled in accordance with the invention, pressure is applied to the ends of the release levers 25 by a throw-out collar 74 (Fig. 7), operated in the usual manner from the clutch pedal (not shown). Forward movement of the throw-out collar 74 will cause the clutch levers to move in a counter-clockwise direction around their fulcra, thereby moving the pressure plate to the right as viewed in Fig. 7, and "flattening" the spring 42 between the opposed regions of the pressure plate and the cover plate 20. When the pressure on the clutch pedal is released, the spring 42 will react against the cover plate 20 and move the pressure plate 16 back into engagement with the driven plate 10.

We claim:

1. In a friction clutch, a cover plate, a pressure plate, and a clutch packing spring comprising an annulus of spring sheet material, curved in radial cross section, with its inner and outer edges both lying on the same side of the plane of its mid-portion, said annulus being interposed between said cover plate and pressure plate with the convex side of its radially inner region in engagement with the cover plate and its outer periphery in engagement with the pressure plate.

2. A clutch spring comprising an annulus of spring sheet material, roughly conical, provided in its inner region with a plurality of radial slits opening into its inner margin and defining a plurality of tongues which are in abutting contact with each other at their side edges.

3. A clutch spring as defined in claim 2, wherein said tongues have a length approximately one-third the radial cross-sectional dimension of the spring.

4. A clutch spring as defined in claim 2, crowned in radial cross section.

5. In a friction clutch for transmitting rotation from one rotating element to another, a cover plate, a pressure plate, a driving member, a driven member adapted to be engaged between said driving member and pressure plate for receiving rotation therefrom, and a clutch packing spring comprising an annulus of spring sheet material, interposed between said cover plate and pressure plate, with its outer peripheral region in engagement with said pressure plate and its inner peripheral region in engagement with said cover plate.

6. In a friction clutch, a centrally apertured cover plate, a pressure plate, and a clutch packing spring comprising an annulus of spring sheet material interposed between said pressure plate and cover plate, with its outer peripheral region in engagement with said pressure plate and its inner peripheral region having substantially the same internal diameter as, and in engagement with, the inner peripheral region of the cover plate.

7. An axially shallow friction clutch comprising a cover plate having a rim portion, a central web portion and a reentrant shoulder portion connecting said rim and web portions, a pressure plate disposed within the confines of the cover plate, a washer type packing spring interposed between the pressure plate and cover plate with its inner and outer peripheral regions in engagement, one with the pressure plate and the other with the cover plate, and a release lever extending through an aperture in said reentrant shoulder portion, fulcrumed against an edge thereof, and having an axial thrust transmitting connection with said pressure plate.

8. An axially shallow friction clutch comprising a cover having a rim portion, a central web portion and a reentrant shoulder portion connecting said rim and web portions, a pressure plate disposed within the confines of said cover, an annular packing spring having its margins in engagement with said web portion and said pressure plate respectively and adapted to urge said cover and pressure plate apart, a release lever extending through an aperture in said reentrant shoulder portion and fulcrumed against an edge thereof, and an axial thrust transmitting connection between said pressure plate and said lever.

9. An axially shallow friction clutch comprising a cover having a rim portion and a reentrant central region, a pressure plate disposed within the confines of said cover, an annular clutch packing spring having its margins in engagement with said reentrant portion and said pressure plate respectively and adapted to urge them apart, a release lever extending through an aperture in said reentrant portion and fulcrumed against an edge thereof, and an axial thrust transmitting connection between said pressure plate and said lever.

10. An axially shallow friction clutch comprising a cover having a rim portion and a reentrant frusto-conical shoulder portion, a pressure plate disposed within the confines of said cover, clutch packing spring means interposed between the pressure plate and cover and adapted to urge them apart, said shoulder portion having an aperture defining at the frusto-conical surface of said shoulder portion an axially directed knife edge, a release lever extending through said aperture and fulcrumed against said knife edge, and an axial thrust transmitting connection between said pressure plate and said lever.

11. An axially shallow friction clutch comprising a cover plate having a rim portion, a central web portion and a reentrant shoulder portion connecting said rim and web portions, a pressure plate disposed within the confines of the cover plate, clutch packing spring means interposed between the pressure plate and cover plate and adapted to urge them apart, a release lever extending through an aperture in said reentrant shoulder portion and fulcrumed against an edge thereof, an axial thrust transmitting connection between said pressure plate and said lever, and a bail of spring wire engaging said lever opposite the fulcrum and having its ends attached to the cover plate, for maintaining the lever in position against the action of centrifugal force.

12. An axially shallow friction clutch comprising a cover plate having a rim portion, a central web portion and a reentrant shoulder portion connecting said rim and web portions, a pressure plate disposed within the confines of the cover plate, clutch packing spring means interposed between the pressure plate and cover plate and adapted to urge them apart, a release lever extending through an aperture in said reentrant shoulder portion and fulcrumed against an edge thereof, an axial thrust transmitting connection between said pressure plate and said lever, and, a bail extending across and engaging said lever and having its ends pivoted to the cover plate in substantial alignment with the fulcrum.

13. An axially shallow friction clutch comprising a cover plate having a rim portion, a central web portion and a reentrant shoulder portion connecting said rim and web portions, a pressure plate disposed within the confines of the cover plate, clutch packing spring means interposed between the pressure plate and cover plate and adapted to urge them apart, a release lever extending through an aperture in said reentrant shoulder portion and fulcrumed against an edge thereof, and an axial thrust transmitting connection between said pressure plate and said lever, said lever being provided with axially projecting hooks in engagement with a radially inner edge of the lever receiving aperture to form the fulcrum.

14. An axially shallow friction clutch comprising a cover plate having a rim portion, a central web portion and a reentrant shoulder portion connecting said rim and web portions, a pressure plate disposed within the confines of the cover plate, clutch packing spring means interposed between the pressure plate and cover plate and adapted to urge them apart, a release lever extending through an aperture in said reentrant shoulder portion and fulcrumed against an edge thereof, and an axial thrust transmitting connection between said pressure plate and said lever, said lever being provided with axially projecting hooks in engagement with a radially inner edge of the lever receiving aperture to form the fulcrum, and with circumferentially extending shoulders adapted to engage a radially outer extremity of said aperture to resist centrifugal force.

15. In a friction clutch, a cover having a rim portion and a reentrant portion, a pressure plate disposed within the confines of the cover, an annular clutch packing spring having its margins in engagement with the pressure plate and reentrant portion respectively, and a release lever extending through an aperture in said reentrant portion and fulcrumed against an edge thereof, said lever having its radially outer end in thrust transmitting connection with said pressure plate for urging the latter either toward or away from the driven element, and being disposed substantially entirely on one side of the radial plane of its fulcrum, whereby to react to centrifugal force and thereby increase the packing pressure against the pressure plate.

16. In a friction clutch, a driving member, a pressure plate, a driven member adapted to be engaged between said pressure plate and driving member, and a packing spring arranged to furnish the pressure for thus engaging the driven member, said spring being in the form of an annulus, curved in radial cross-section, roughly conical, with its inner margin reentrant into the space circumscribed by its outer region.

17. A friction clutch as defined in claim 16, wherein the cross-sectional curvature of the spring is in a single direction throughout a major portion of the radius thereof.

18. In a friction clutch, a driving member, a pressure plate, a driven member, and a packing spring for causing said driven member to be engaged between said driving member and pressure plate, said packing spring being in the form of an annulus, roughly conical, curved in radial cross-section throughout its entire circumference, and arranged so that its inner margin under deflection approaches the plane of its outer margin.

HAROLD NUTT.
RICHARD L. SMIRL.